April 23, 1957 R. G. NELSON 2,790,075
DELAYED-PULSE GENERATING SYSTEM
Filed Oct. 23, 1953 2 Sheets-Sheet 1

United States Patent Office 2,790,075
Patented Apr. 23, 1957

2,790,075
DELAYED-PULSE GENERATING SYSTEM

Rudolph G. Nelson, Freeport, N. Y., assignor to Hazeltine Research, Inc., Chicago, Ill., a corporation of Illinois Application October 23, 1953, Serial No. 387,853

10 Claims. (Cl. 250—27)

General

This invention relates to delayed-pulse generating systems and, more particularly, to such systems of the type for generating repetitive reference pulses and additional repetitive pulses individually delayed with respect thereto wherein the delay interval preferably is adjustable over a considerable time range.

Delayed-pulse generating systms are useful for testing range-indicating circuits of radar and radio-navigation equipment. In such applications, repetitive reference pulses are commonly supplied to the equipment-under-test, while repetitive delayed pulses are supplied to a triggered sweep circuit of a cathode-ray display device. The delay interval then is adjusted approximately to the time interval between actuation of the equipment by a reference pulse and a desired target or echo response of the equipment to provide an indication of the performance of the equipment.

Some delayed-pulse generating systems heretofore proposed have been of the type which includes a saw-tooth timing-signal generator having an adjustable parameter in a resistor-condenser timing network thereof. The delay interval between the reference pulse and the delayed pulse ordinarily is indicated by a calibrated dial associated with the adjustable parameter. The ranges of adjustment of the delay intervals of such systems have been limited to relatively small maximum values of the order of 1,000 microseconds.

The delay-interval indicating dial of a system of a type heretofore proposed is ordinarily calibrated against a suitable primary timing standard and, hence, the delay-interval indication may be subject to error because of the possibility of subsequent undesired parameter variations of the system. The use of a calibrated dial also leads to human errors in readings and adjustments thereof. Also, in a system of this type, the error in the delay-interval indication inherently tends to increase as the delay interval is increased because of the cumulative effect of incremental circuit errors.

Another type of delayed-pulse generating system heretofore proposed includes a primary-pulse source and a plurality of frequency dividers coupled in cascade thereto for deriving a plurality of pulses of different subharmonic pulse repetition periods representative of maximum coarse and vernier delay intervals. Such a system also includes a plurality of pulse-counting circuits individually coupled to the frequency dividers for individually counting a selectable number of primary and subharmonic pulses to provide a desired delay interval. For relatively short delay intervals, for example, of the order of 600 microseconds, a system of this type has a lack of precision which is undesirable for many applications and, while the system may be modified to develop relatively long delay intervals, such modification involves either complex circuitry or additional lack of precision in determining the delay interval.

It is an object of the invention, therefore, to provide a new and improved delayed-pulse generating system which substantially avoids one or more of the foregoing limitations of systems heretofore proposed.

It is another object of the invention to provide a new and improved delayed-pulse generating system in which the delay interval is adjustable over a wide time range of, for example, 0 to 10,000 microseconds.

It is a further object of the invention to provide a new and improved delayed-pulse generating system in which the delay interval is determined with a high degree of precision.

It is a still further object of the invention to provide a new and improved delayed-pulse generating system in which the delay interval is determined with a high degree of precision for values of time delay, for example, of the order of 10,000 microseconds.

It is an additional object of the invention to provide a new and improved delayed-pulse generating system in which the delay interval is determined with a high degree of precision and no indicator calibration thereof is necessary during operation.

It is yet another object of the invention to provide a new and improved delayed-pulse generating system in which the delay interval is determined with a high degree of precision and is easily and accurately indicated.

In accordance with the invention, a system for generating repetitive reference pulses and additional repetitive pulses individually delayed with respect thereto comprises periodic-pulse supply-circuit means and a first pulse-selective circuit means coupled to the periodic-pulse supply-circuit means for translating selected periodic pulses to provide repetitive reference pulses. The system also includes a timing circuit coupled to the first pulse-selective circuit means for developing repetitive timing signals having undesirable variations in the duration thereof. The system further includes a circuit coupled to the periodic-pulse supply-circuit means and the timing circuit for applying periodic pulses thereto to control the terminations of the timing signals, thereby reducing the variations in duration of the timing signals. The system additionally includes a second pulse-selective circuit means coupled to the periodic-pulse supply-circuit means and the timing circuit and controlled by the terminations of the timing signals for translating selected periodic pulses individually occurring after the terminations of the timing signals, thereby providing repetitive pulses individually precisely delayed with respect to the reference pulses.

For a better understanding of the present invention, together with other and further objects thereof, reference is had to the following description taken in connection with the accompanying drawings, and its scope will be pointed out in the appended claims.

Referring to the drawings.

Figure 1:
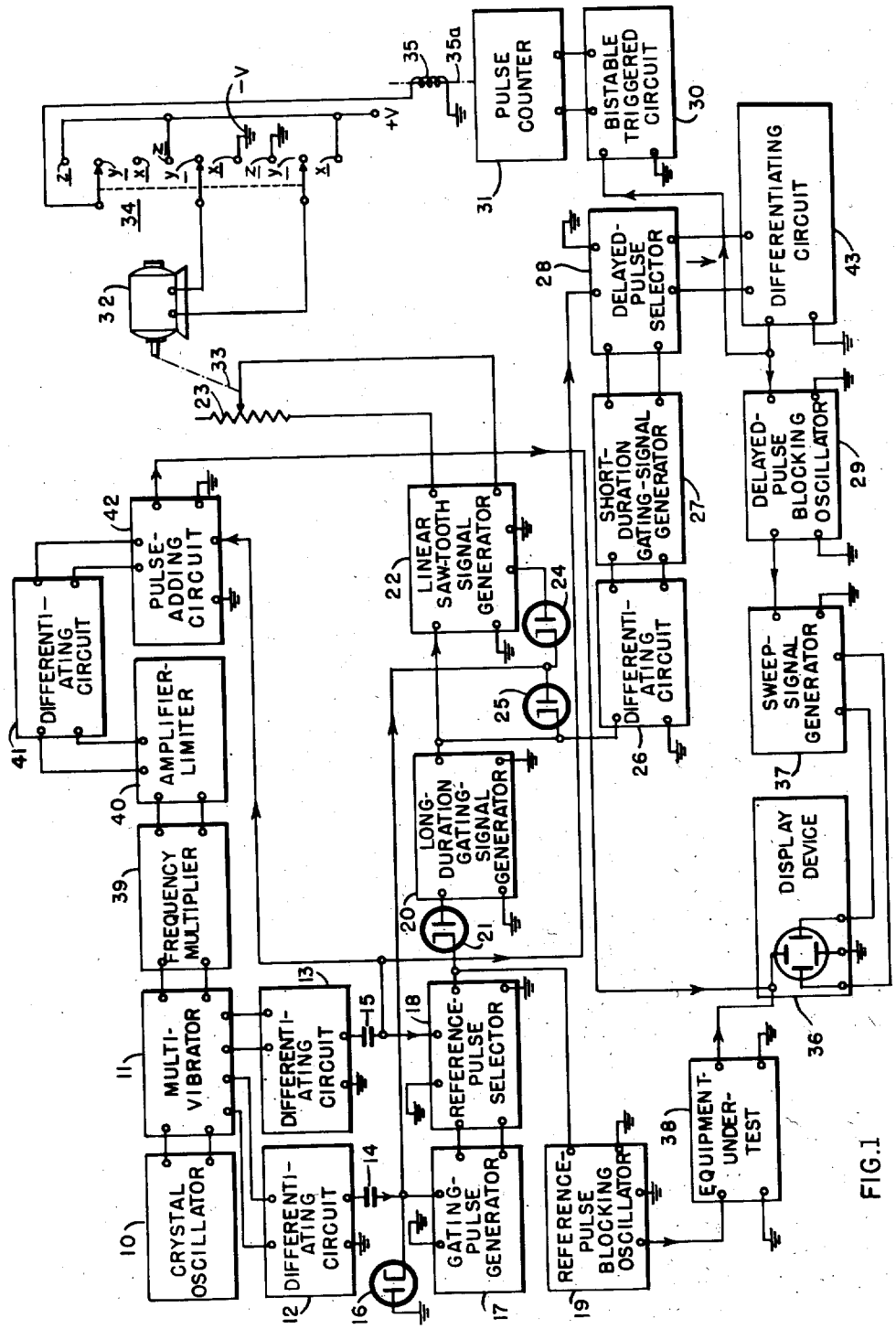
Fig. 1 is a circuit diagram, partly schematic, of a delayed-pulse generating system constructed in accordance with the present invention.

Description of delayed-pulse generating system of Fig. 1

Referring to Fig. 1 of the drawings, the system for generating repetitive reference pulses and additional repetitive pulses individually delayed with respect thereto, as there represented, comprises periodic-pulse supply-circuit means which, for example, may include crystal-control means for generating periodic pulses having a period determined with crystal precision. This crystal-control means includes, for example, a crystal oscillator 10 of conventional construction for generating a sinusoidal output signal, a free-running or astable multivibrator 11 of conventional construction coupled thereto for developing rectangular wave signals synchronized with the oscillator output signal, and a pair of conventional differentiating circuits 12 and 13 coupled to the multivibrator 11 for deriving pulses from the edges of the rectangular wave signals. A diode 16 is coupled across the output circuit of unit 12 with such polarity as to prevent the differentiating circuit 12 from developing negative output pulses.

The system also includes a first pulse-selective circuit means preferably comprising a repetitive gating-pulse generator 17 coupled to the differentiating circuit 12 of the periodic-pulse supply-circuit means through a coupling condenser 14 and also including a gated reference-pulse selector 18 coupled to the gating-pulse generator 17 and to the differentiating circuit 13 of the periodic-pulse supply-circuit means through a coupling condenser 15 for repetitively translating during gating-pulse intervals selected periodic pulses to provide repetitive reference pulses. The gating-pulse generator 17 may, for example, be a triggered blocking oscillator of conventional construction and the pulse selector 18 may be, for example, a conventional gated or coincidence circuit. The pulse selector 18 may be coupled to a reference-pulse blocking oscillator 19 of conventional construction which, in response to the repetitive reference pulses applied thereto, generates repetitive output reference pulses of preferred magnitude and duration.

The system further includes a timing circuit comprising, for example, a long-duration gating-signal generator 20 coupled to the pulse selector 18 through a coupling diode 21 for developing repetitive gating or timing signals having undesirable variations in the duration thereof. There preferably is also provided a linear saw-tooth signal generator 22 of conventional construction coupled to the long-duration gating-signal generator 20 for controlling the duration of the gating signals. The long-duration gating-signal generator 20 may be, for example, a conventional monostable multivibrator circuit, preferably having a normal recovery interval longer than the maximum desired timing interval. The saw-tooth signal generator 22 preferably includes an adjustable parameter comprising a resistor 23 for adjusting the duration of repetitive gating and saw-tooth signals. The generator 22 perferably is of a type capable of developing linear saw-tooth signals of long duration, for example, of the order of 10,000 microseconds.

The system additionally includes a circuit coupled to the periodic-pulse supply-circuit means and to the timing circuit for applying the periodic pulses thereto to control the terminations of the timing signals, thereby reducing the variations in duration of the timing signals. This circuit comprises, for example, normally nonconductive series-connected diodes 24 and 25. The cathode of diode 25 is coupled to an output circuit of the long-duration gating-signal generator 20 and the anode of the diode 24 is coupled to the output circuit of the saw-tooth signal generator 22 for comparing the long-duration gating and saw-tooth signals while the junction of the cathode of the diode 24 and the anode of the diode 25 is coupled to the differentiating circuit 12 of the periodic-pulse supply-circuit means for synchronizing the terminations of the gating and saw-tooth signals with periodic pulses occurring when the magnitudes of these signals are approximately equal.

The system additionally includes a second pulse-selective circuit means coupled to the periodic-pulse supply-circuit means and the timing circuit and controlled by the terminations of the timing signals for translating selected periodic pulses individually occurring after the terminations of the timing signals, thereby providing repetitive pulses individually precisely delayed with respect to the reference pulses. The second pulse-selective circuit means preferably comprises a short-duration gating-signal generator 27 coupled to the long-duration gating-signal generator 20 of the timing circuit through a differentiating circuit 26 and also includes a gated delayed-pulse selector 28 comprising, for example, a conventional type of gated or coincidence circuit, coupled to the short-duration gating-signal generator 27 and to the differentiating circuit 13 of the periodic-pulse supply-circuit means. The short-duration gating-signal generator 27 may be, for example, a triggered blocking oscillator of conventional construction controlled by the terminations of the long-duration gating signals for supplying repetitive gating signals of duration less than the period of the periodic pulses for enabling the pulse selector 28 to translate selected periodic pulses.

The second pulse-selective circuit means may also include a differentiating circuit 43 coupled to the delayed-pulse selector 28 for attenuating, relative to the selected periodic pulses, undesired signals which may be developed by the pulse selector 28. The delayed-pulse selector 28 is coupled through the differentiating circuit 43 to a delayed-pulse blocking oscillator 29 of conventional construction which, in response to the repetitive delayed pulses applied thereto, generates repetitive delayed pulses of preferred magnitude and duration.

The system may also include pulse-counting means coupled to the differentiating circuit 43 of the second pulse-selective circuit means for effectively counting the number of periodic pulses which occur between each of the reference pulses and the corresponding pulse delayed with respect thereto, thereby giving an accurate indication of the delay interval. The pulse-counting means may comprise, for example, a bistable triggered circuit 30, such as a conventional bistable multivibrator or "flip-flop" circuit, and a pulse counter 31 which may be, for example, a mechanical counter of conventional construction.

A direct-current motor 32 is mechanically coupled to the adjustable resistor 23 of the saw-tooth signal generator 22, as indicated by a broken line 33, for adjusting the value of the resistor. A triple-pole, double-throw, polarity-reversing switch 34 of conventional construction is coupled between the motor 32 and a potential source +V, —V for controlling the sense of adjustment of the resistor 23. The potential source +V, —V, is also coupled through the switch 34 in one position thereof to a solenoid relay 35 which, in turn, is mechanically coupled, as indicated by broken line 35a, to the pulse counter 31 for causing the counter to add or subtract in accordance with the sense of adjustment of the resistor 23.

As mentioned previously, a delayed-pulse generating system is useful in conjunction with a conventional cathode-ray oscilloscope, represented in Fig. 1 by a display device 36 and a sweep-signal generator 37 coupled thereto, for obtaining indications of the performance of radar-type pulse-echo equipment, represented in Fig. 1 by a unit 38 designated equipment-under-test. One set of deflection plates of the display device 36 is coupled to the sweep-signal generator 37 which, in turn, is coupled to and controlled by the delayed-pulse blocking oscillator 29 for supplying to these deflection plates a repetitive time-base signal synchronized with the repetitive delayed pulses. The input circuit of the equipment-under-test 38 is coupled to the reference-pulse blocking oscillator 19 of the delayed-pulse generating system and the output circuit is coupled to the other set of deflection plates of the display device 36.

Figure 2:
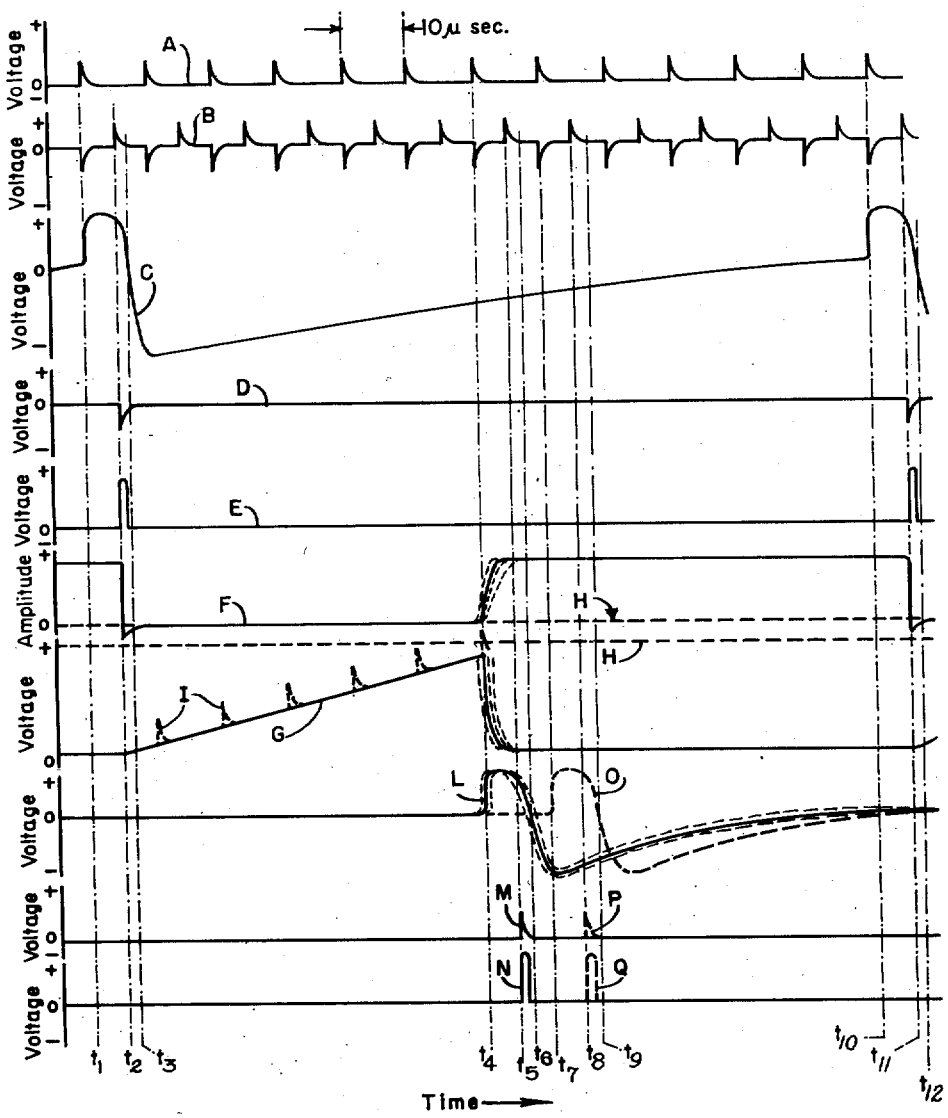
Fig. 2 is a graph representing signals developed at various points of the Fig. 1 system and used in explaining the operation thereof.

In order to obtain increased accuracy when using the delayed-pulse generating system in conjunction with an oscilloscope, the system may include means for generating marker timing pulses of closer spacing than that of the positive periodic pulses represented by Curve B of Fig. 2 and, to this end, the system may include frequency-multiplying means comprising, for example, a frequency multiplier 39 coupled to the multivibrator 11 for deriving a sinusoidal harmonic component from the rectangular wave signal thereof. There may be coupled to the frequency multiplier 39 in cascade and in the order named an amplifier-limiter 40 for developing a rectangular wave signal from the sinusoidal harmonic component, a differentiating circuit 41 for developing marker pulses from the harmonic-frequency rectangular wave signal, and a pulse-adding circuit 42 which is also coupled to the differentiating circuit 13 of the periodic-pulse supply-circuit means for developing marker timing pulses of which each pulse that corresponds to a positive periodic pulse of Curve B is accentuated. The output terminals of the pulse-adding circuit 42 are coupled to the second set of deflection plates of the display device 36 for supplying the resultant marker pulses thereto.

*Operation of delayed-pulse generating system of Fig. 1*

Considering now the operation of the delayed-pulse generating system just described, the crystal oscillator 10 generates and applies to the free-running multivibrator 11 a sinusoidal signal having a frequency of, for example, 100 kilocycles for synchronizing the multivibrator 11 so that it develops precisely determined rectangular wave signals of the same frequency. A first of these rectangular wave signals is applied to the differentiating circuit 12 which derives positive pulses from the leading edges thereof. The diode 16 prevents the differentiating circuit 12 from developing any negative pulses so that the resultant signal at the output terminals thereof, as represented by Curve A of Fig. 2, is a succession of precisely spaced positive pulses of short duration. The spacing between successive positive pulses is precisely determined by the frequency of the applied rectangular wave signal and may, for example, be 10 microseconds.

A second of the rectangular wave signals, preferably having a 180° phase shift with respect to the first, is applied to the differentiating circuit 13 which derives from the leading and trailing edges thereof a succession of precisely spaced alternate positive and negative pulses, respectively, of short duration and represented by Curve B of Fig. 2. The positive pulses represented by Curve B are similar to those of Curve A and occur midway between the positive pulses of Curve A.

The periodic pulses represented by Curve A are supplied to the gating-pulse generator 17 which, in response thereto, generates a repetitive gating signal, represented by Curve C of Fig. 2. The positive portions of this signal, such as those occurring during the representative intervals $t_1$–$t_3$ and $t_{10}$–$t_{12}$, repetitively gate the reference-pulse selector 18 to a translatory operating condition. The negative portions of the signal represented by Curve C, such as the one occurring in the interval $t_3$–$t_{10}$, represent the recovery interval of the gating-pulse generator 17 and for the duration thereof input periodic pulses of Curve A are not effective to cause triggering of the generator 17. For convenience, the arrowheads represent the direction in which the various signals are effectively translated.

The periodic pulses from the differentiating circuit 13, represented by Curve B of Fig. 2, are supplied to the gated reference-pulse selector 18. During intervals, such as $t_1$–$t_3$, while a positive gating portion of the signal represented by Curve C of Fig. 2 is supplied to the reference-pulse selector 18, that unit translates any of the periodic pulses represented by Curve B of Fig. 2 that occur during such intervals. In this manner, the pulse generator 17 repetitively enables the pulse selector 18 to translate selected periodic pulses.

The translating interval or interval of the positive gating portion of the signal represented by Curve C, such as the interval $t_1$–$t_3$, is preferably of duration less than the repetition period of the periodic pulses, for example 7 microseconds so that the pulse selector 18 translates only selected positive pulses of Curve B, such as the pulse occurring at $t_2$, which immediately follow those positive pulses of Curve A, such as the one occurring at $t_1$, which trigger the gating-pulse generator 17. The pulse selector 18 thus translates selected periodic pulses to provide repetitive reference pulses represented by Curve D of Fig. 2. The repetition frequency of these reference pulses is primarily determined by the recovery interval of the gating-pulse generator 17 and may be, for example, of the order of 100 pulses per second. These repetitive reference pulses are supplied to the reference-pulse blocking oscillator 19 which, in response thereto, generates corresponding repetitive reference pulses of preferred magnitude and duration, as represented by Curve E of Fig. 2.

The repetitive reference pulses represented by Curve D are also supplied to the long-duration gating-signal generator 20 through the coupling diode 21. The long-duration gating-signal generator 20 may, for example, have stable and unstable operating modes. The interval during which the circuit would normally remain in the unstable mode preferably is of greater duration than the maximum desired delay interval between corresponding reference pulses and delayed pulses, for example, greater than 10,000 microseconds.

The application to the generator 20 of a reference pulse, such as the one occurring at time $t_2$, causes the generator to switch from its normal stable operating mode to its unstable operating mode and, thus, to generate a long-duration gating signal, as represented by Curve F of Fig. 2. This gating signal is applied to the linear saw-tooth signal generator 22 and enables the generator 22 to generate a linear saw-tooth or primary timing signal during the occurrence thereof, as represented by the portion of Curve G of Fig. 2 in the time interval $t_2$–$t_4$. The adjustable resistor 23 of the saw-tooth signal generator 22 controls the duration of the primary timing signals over a range of, for example, 0 to 10,000 microseconds.

The long-duration gating signal represented by Curve F is also supplied to the cathode of the comparing diode 25 and the resultant potential level there produced during the interval $t_2$–$t_4$ serves as a reference-potential level represented by Curve H of Fig. 2. The saw-tooth timing signal represented by Curve G and developed by the saw-tooth signal generator 22 is effectively supplied through the coupling diode 24 to the anode of the comparing diode 25. Positive periodic pulses from the differentiating circuit 12, represented by Curve A, are also supplied to the anode of the diode 25. These periodic pulses effectively add to the saw-tooth timing signal, as represented by Curve I of Fig. 2. Accordingly, the diode 25 effectively compares the reference-potential level, represented by Curve H, and the combined saw-tooth signal plus periodic pulses, represented by Curves G and I. When the magnitude of the combined saw-tooth signal and periodic pulses of Curves G and I exceeds the reference-potential level of Curve H, such as at time $t_4$, the diode 25 is rendered conductive and feeds back a transient quenching signal to the long-duration gating-signal generator 20 to switch the generator 20 to its stable operating mode, thereupon causing termination of the gating signal, represented by Curve F, and consequently the saw-tooth timing signal, represented by Curve G.

As a result of inherent conduction-time variations involved in the comparing action of the diode 25, such as slight potential, random noise, and tube parameter variations, both the long-duration gating signal and the saw-tooth signal, represented by Curves F and G, respectively, have undesirable variations or "jitter" in the trailing edges and, hence, the durations thereof, as represented in broken-line construction on Curves F and G. These undesirable variations are minimized by utilizing the positive periodic pulses represented by Curves A and I to synchronize the terminations of the long-duration gating and saw-tooth signals with the periodic pulses occurring when the magnitudes of these signals are approximately equal.

The trailing edge of the long-duration gating signal represented by Curve F is supplied to the differentiating circuit 26 which derives therefrom a short-duration positive pulse. This pulse is supplied to the short-duration gating-signal generator 27 which, in response thereto, generates a short-duration gating signal, as represented by Curve L of Fig. 2. The positive gating portion of this signal, such as occurring in the time interval $t_4$–$t_9$, preferably is of duration less than the period of the positive periodic pulses of Curve B and may be, for example, of the order of 7 microseconds. This short-duration gating signal is, in turn, supplied to the delayed-pulse selector 28 and causes the pulse selector 28 to operate in a translatory mode during the time interval $t_4$–$t_9$. The duration of the translatory interval of the pulse selector 28 is such that it permits during this operating cycle translation of only the positive periodic pulse of Curve B of Fig. 2 occurring at time $t_5$. In this manner, the delayed-pulse selector 28 translates selected periodic pulses individually occurring after the terminations of the timing signals, thereby providing repetitive pulses, one thereof being represented by Curve M of Fig. 2, individually precisely delayed with respect to the reference pulses, represented by Curve D of Fig. 2. These repetitive delayed pulses are supplied to the differentiating circuit 43 which, because of the short duration and fast rise time of these pulses, provides little attenuation thereof. The differentiating circuit 43 serves to attenuate any undesired signals having relatively long rise times which may be produced by the pulse selector 28. After translation by the differentiating circuit 43, the repetitive delayed pulses are supplied to the delayed-pulse blocking oscillator 29 which, in response thereto, generates corresponding repetitive delayed pulses of preferred magnitude and duration, such as the one represented by Curve N of Fig. 2.

While the short-duration gating signal represented by Curve L may have some "jitter," as represented by the broken-line construction thereof, because of some remaining "jitter" in the trailing edge of the long-duration gating signal represented by Curve F, this short-duration gating-signal "jitter" is not sufficient to cause translation of an undesired periodic pulse, such as the negative periodic pulse occurring at time $t_7$. Moreover, there is no "jitter" in the selected delayed pulses.

The repetitive delayed pulses, such as that represented by Curve M, may also be supplied to counting means comprising the bistable triggered circuit 30 and the pulse counter 31. The bistable triggered circuit, as previously mentioned, may be a "flip-flop" circuit capable of responding to successive positive pulses only when reset by intervening negative pulses. The bistable triggered circuit 30, in response to a first positive delayed pulse, supplies a pulse signal to the pulse counter 31 which is effective to count or register the occurrence of this pulse. The delayed-pulse selector 28, previously discussed, preferably is capable of translating either negative or positive periodic pulses of the signal represented by Curve B but, as long as the timing parameters of the saw-tooth signal generator 22 remain fixed, the duration of the short gating signal, represented by Curve L, is such that the pulse selector 28 does not translate any negative pulses. The circuit 30, therefore, is effective to respond to the first positive pulse but is incapable of responding to subsequent positive pulses because the circuit 30 has not been reset by an intervening negative pulse.

As the timing parameter of the saw-tooth signal generator 22 represented by the adjustable resistor 23 is altered, the primary timing interval of the generator 22 may, for example, increase and, hence, the short-duration gating signal shifts to a time position, represented by broken-line Curve O of Fig. 2, such that the pulse selector 28 is enabled to translate the positive pulse occurring at time $t_8$, represented by broken-line Curve P and immediately following the previously translated positive pulse of Curve M occurring at time $t_5$. In the process of shifting its relative time position, the short-duration gating signal enables the pulse selector 28 to pass the intervening negative pulse of Curve B occurring at time $t_7$, thereby resetting the bistable triggered circuit 30 and permitting a response to the first of the repetitive delayed pulses translated by the pulse selector 28 for this new time position of the short-duration gating signal. Thus, the pulse counter 31 is enabled to count each time the short-duration gating signal changes its relative time position by an amount corresponding to the time separation between positive portions of the periodic-pulse signal represented by Curve B of Fig. 2. The pulse counter 31, therefore, registers or effectively counts the number of periodic pulses which occur between each of the reference pulses and the corresponding pulse delayed with respect thereto, thereby giving an accurate indication of the delay interval. The primary timing interval of the generator 22 may be increased to, for example, 10,000 microseconds by suitable adjustment of the resistor 23.

Adjustment of the resistor 23 of the saw-tooth signal generator 22 is achieved by temporarily adjusting the motor switch 34 from a neutral position $y$ to either of the operating positions $x$ or $z$ to supply an operating potential from the source +V to the motor 32, thereby actuating the motor 32 and, hence, adjusting the resistor 23. Depending on the operating position of the switch 34 and, hence, the polarity of the operating potential applied to motor 32, the primary timing interval of the saw-tooth signal generator 22 either increases or decreases. With the switch in the operating position $z$, the operating potential +V is also supplied to the relay 35, thereby actuating the relay 35 and enabling that unit to count in a sense opposite to the counting sense with the switch in operating position $x$ and the relay 35 de-energized. In this manner, the counter 31 may add or subtract depending on whether the primary timing interval is increasing or decreasing.

The repetitive delayed pulses generated by the delayed-pulse blocking oscillator 29, such as the one represented by Curve N of Fig. 2, may be utilized to synchronize the operation of the sweep-signal generator 37 which supplies sweep signals to one set of deflection plates of the display device 36. The repetitive reference pulses, developed by the reference-pulse blocking oscillator 19 and reprsented by Curve E of Fig. 2, are supplied to the equipment-under-test 38. The equipment-under-test 38, in response to these repetitive reference pulses, supplies, for example, radar-target or echo pulses to deflection plates of the display device 36. The delay interval between each reference pulse and the corresponding delayed pulse, as controlled by the saw-tooth signal generator 22, is then adjusted until the echo pulse is displayed on the oscilloscope display device 36. When this condition is attained, the pulse counter 31 then indicates the number of positive periodic pulses of Curve B that have occurred between the reference pulse which triggers the equipment 38 and the delayed pulse which is effective to trigger the sweep-signal generator 37. Thus, the counter 31 accurately indicates the delay interval between the reference pulse of Curve E and the desired echo pulse.

Figure 3:
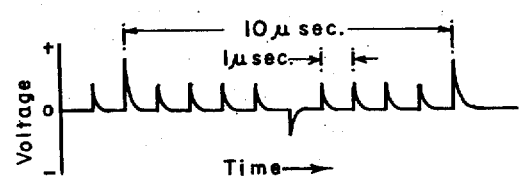
Fig. 3 is a graph representing a marker timing signal developed by the Fig. 1 system.

In order more accurately to indicate this delay interval, the frequency multiplier 39 derives a higher frequency sinusoidal component, for example, a 1-megacycle or tenth-harmonic component from the 100-kilocycle rectangular wave output signal of the multivibrator 11. This 1-megacycle component is, in turn, supplied to the amplifier-limiter 40 which amplifies and limits the harmonic component to obtain therefrom a rectangular wave signal of harmonic frequency. This rectangular wave signal is supplied to the differentiating circuit 41 which derives therefrom a succession of marker timing pulses of 1-megacycle pulse-repetition frequency or, in other words, 1-microsecond spacing. The marker timing pulses are supplied to the pulse-adding circuit 42 wherein they are added to the 100-kilocycle positive periodic pulses represented by Curve B of Fig. 2 and supplied thereto by the differentiating circuit 13. The resultant marker timing pulses are represented by Fig. 3 with each pulse that corresponds to a positive periodic pulse of Curve B being accentuated. These resultant marker pulses are supplied to the deflection plates of the display device 36 to indicate the 1-microsecond marker interval, relative to the delayed pulse, during which the response of the equipment 38 occurs.

From the foregoing description of the invention, it will be apparent that the delayed-pulse generating system, constructed in accordance with the present invention, has the advantage that the delay interval is determined with a high degree of precision even for large values of time delay, for example, of the order of 10,000 microseconds.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for generating repetitive reference pulses and additional repetitive pulses individually delayed with respect thereto comprising: crystal-control means for generating periodic pulses having a period determined with crystal precision; a first pulse-selective circuit means including a repetitive gating-pulse generator coupled to said periodic-pulse generating means and a first gated pulse selector coupled to said gating-pulse generator and to said generating means for repetitively translating selected periodic pulses during gating intervals to provide repetitive reference pulses; a timing circuit including a long-duration gating-signal generator coupled to said first gated pulse selector for developing repetitive long-duration gating signals having undesirable variations in the duration thereof and including a saw-tooth signal generator coupled to said long-duration gating-signal generator for controlling the duration of said long-duration gating signals; circuit means coupled to said long-duration gating-signal generator and said saw-tooth signal generator for comparing said long-duration gating and saw-tooth signals and also coupled to said periodic-pulse generating means for synchronizing the terminations of said long-duration gating and saw-tooth signals with periodic pulses occurring when the magnitudes of said signals are approximately equal, thereby reducing said variations in duration of said gating signals; and a second pulse-selective circuit means including a short-duration gating-signal generator coupled to said timing circuit and a second gated pulse selector coupled to said short-duration gating-signal generator and to said periodic-pulse generating means, said short-duration gating-signal generator being controlled by said terminations of said long-duration gating signals for supplying gating signals of duration less than the period of said periodic pulses for enabling said second gated pulse selector to translate selected periodic pulses individually occurring after said terminations of said long-duration gating signals, thereby providing repetitive pulses individually precisely delayed with respect to said reference pulses.

2. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit coupled to said first pulse-selective circuit means for developing repetitive timing signals having undesirable variations in the duration thereof; a circuit coupled to said periodic-pulse supply-circuit means and said timing circuit for applying periodic pulses thereto to control the terminations of said timing signals, thereby reducing said variations in duration of said timing signals; and a second pulse-selective circuit means coupled to said periodic-pulse supply-circuit means and said timing circuit and controlled by said terminations of said timing signals for translating selected periodic pulses individually occurring after said terminations of said timing signals, thereby providing repetitive pulses individually precisely delayed with respect to said reference pulses.

3. A system for generating repetitive reference pulses and additional repetitive pulses individually delayed with respect thereto comprising: crystal-control means for generating periodic pulses having a period determined with crystal precision; a first pulse-selective circuit means coupled to said periodic-pulse generating means for translating selected periodic pulses to provide repetitive reference pulses; a timing circuit coupled to said first pulse-selective circuit means for developing repetitive timing signals having undesirable variations in the duration thereof; a circuit coupled to said periodic-pulse generating means and said timing circuit for applying periodic pulses thereto to control the terminations of said timing signals, thereby reducing said variations in duration of said timing signals; and a second pulse-selective circuit means coupled to said periodic-pulse generating means and said timing circuit and controlled by said terminations of said timing signals for translating selected periodic pulses individually occurring after said terminations of said timing signals, thereby providing repetitive pulses individually precisely delayed with respect to said reference pulses.

4. A system for generating repetitive reference pulses and additional repetitive pulses individually delayed with respect thereto comprising: periodic-pulse supply-circuit means; a first pulse-selective circuit means including a repetitive gating-pulse generator coupled to said periodic-pulse supply-circuit means and a gated pulse selector coupled thereto and to said gating-pulse generator for repetitively translating during gating intervals selected periodic pulses to provide repetitive reference pulses; a timing circuit coupled to said gated pulse selector for developing repetitive timing signals having undesirable variations in the duration thereof; a circuit coupled to said periodic-pulse supply-circuit means and said timing circuit for applying periodic pulses thereto to control the terminations of said timing signals, thereby reducing said variations in duration of said timing signals; and a second pulse-selective circuit means coupled to said periodic-pulse supply-circuit means and said timing circuit and controlled by said terminations of said timing signals for translating selected periodic pulses individually occurring after said terminations of said timing signals, thereby providing repetitive pulses individually precisely delayed with respect to said reference pulses.

5. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit having an adjustable parameter therein coupled to said first pulse-selective circuit means for developing repetitive timing signals of duration adjustable over a wide time range and having undesirable variations in the duration thereof; a circuit coupled to said periodic-pulse supply-circuit means and said timing circuit for applying periodic pulses thereto to control the terminations of said timing signals, thereby reducing said variations in duration of said timing signals; and a second pulse-selective circuit means coupled to said periodic-pulse supply-circuit means and said timing circuit and controlled by said terminations of said timing signals for translating selected periodic pulses individually occurring after said terminations of said timing signals, thereby providing repetitive pulses individually having a precisely determined time delay with respect to said reference pulses which is adjustable over a wide range.

6. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit including a long-duration gating-signal generator coupled to said first pulse-selective circuit means for developing repetitive gating signals having undesirable variations in the duration thereof and including a saw-tooth signal generator coupled to said gating-signal generator for controlling the duration of said gating signals; a circuit coupled to said periodic-pulse supply-circuit means and said timing circuit for applying periodic pulses thereto to control the terminations of said gating signals, thereby reducing said variations in duration of said gating signals; and a second pulse-selective circuit means coupled to said periodic-pulse supply-circuit means and said timing circuit and controlled by said terminations of said gating signals for translating selected periodic pulses individually occurring after said terminations of said gating signals, thereby providing repetitive pulses individually precisely delayed with respect to said reference pulses.

7. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit including a long-duration gating-signal generator coupled to said first pulse-selective circuit means for developing repetitive gating signals having undesirable variations in the duration thereof and including a saw-tooth signal generator coupled to said long-duration gating-signal generator for controlling the duration of said gating signals; a circuit coupled to said gating-signal generator and said saw-tooth signal generator for comparing said gating and saw-tooth signals and also coupled to said periodic-pulse supply circuit means for synchronizing the terminations of said gating and saw-tooth signals with periodic pulses occurring when the magnitudes of said signals are approximately equal, thereby reducing said variations in duration of said gating signals; and a second pulse-selective circuit means coupled to said periodic-pulse supply-circuit means and said timing circuit and controlled by said terminations of said gating signals for translating selected periodic pulses individually occurring after said terminations of said gating signals, thereby providing repetitive pulses individually precisely delayed with respect to said reference pulses.

8. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit coupled to said first pulse-selective circuit means for developing repetitive timing signals having undesirable variations in the duration thereof; a circuit coupled to said periodic-pulse supply-circuit means and said timing circuit for applying periodic pulses thereto to control the terminations of said timing signals, thereby reducing said variations in duration of said timing signals; and a second pulse-selective circuit means including a short-duration gating-signal generator coupled to said timing circuit and a gated pulse selector coupled to said short-duration gating-signal generator and to said periodic-pulse supply-circuit means, said short-duration gating-signal generator being controlled by said terminations of said timing signals for supplying gating signals of duration less than the period of said periodic pulses for enabling said gated pulse selector to translate selected periodic pulses individually occurring after said terminations of said timing signals, thereby providing repetitive pulses individually precisely delayed with respect to said reference pulses.

9. A system for generating repetitive reference pulses and additional repetitive pulses individually delayed with respect thereto comprising: periodic-pulse supply-circuit means; a first pulse-selective circuit means coupled to said periodic-pulse supply-circuit means for translating selected periodic pulses to provide repetitive reference pulses; a timing circuit coupled to said first pulse-selective circuit means for developing repetitive timing signals having undesirable variations in the duration thereof; a circuit coupled to said periodic-pulse supply-circuit means and said timing circuit for applying periodic pulses thereto to control the terminations of said timing signals, thereby reducing said variations in duration of said timing signals; a second pulse-selective circuit means coupled to said periodic-pulse supply-circuit means and said timing circuit and controlled by said terminations of said timing signals for translating selected periodic pulses individually occurring after said terminations of said timing signals, thereby providing repetitive pulses indivdually precisely delayed with respect to said reference pulses; and pulse-counting means coupled to said second pulse-selective circuit means for registering the number of said periodic pulses which occur between each of said reference pulses and the corresponding pulse delayed with respect thereto, thereby giving an accurate indication of the delay interval.

10. A system for generating repetitive reference pulses and additional repetitive pulses individually delayed with respect thereto comprising: periodic-pulse supply-circuit means having a predetermined pulse-repetition period; a first pulse-selective circuit means coupled to said periodic-pulse supply-circuit means and having translating intervals of predetermined duration less than said repetition period for translating selected periodic pulses to provide repetitive reference pulses; a timing circuit coupled to said first pulse-selective circuit means for developing repetitive timing signals having undesirable variations in the duration thereof; a circuit coupled to said periodic-pulse supply-circuit means and said timing circuit for applying thereto periodic pulses of said predetermined repetition period to control the terminations of said timing signals, thereby reducing said variations in duration of said timing signals; and a second pulse-selective circuit means having translating intervals of predetermined duration less than said predetermined repetition period coupled to said periodic-pulse supply-circuit means and said timing circuit and controlled by said terminations of said timing signals for translating a single selected periodic pulse after each of said terminations of said timing signals, thereby providing repetitive pulses individually precisely delayed with respect to said reference pulses.

References Cited in the file of this patent

UNITED STATES PATENTS

| | | |
|---|---|---|
| 2,166,688 | Kell | July 18, 1939 |
| 2,440,261 | Ginzton | Apr. 27, 1948 |
| 2,466,044 | Schoenfeld | Apr. 5, 1949 |
| 2,468,097 | Moore | Apr. 26, 1949 |
| 2,665,410 | Burbeck | Jan. 5, 1954 |